United States Patent [19]
Ilkhanov

[11] Patent Number: 6,082,475
[45] Date of Patent: Jul. 4, 2000

[54] ROBOTIC LEG FOR TRAVERSING A PATH SIMILAR TO THAT OF A HUMAN LEG DURING WALKING

[76] Inventor: Azer Ilkhanov, 716 Ocean Pkwy., Apt. 2-H, Brooklyn, N.Y. 11230

[21] Appl. No.: 09/108,419

[22] Filed: Jul. 1, 1998

[51] Int. Cl.$^7$ .................................................. B62D 51/06
[52] U.S. Cl. .............................................. 180/8.1; 305/2
[58] Field of Search ................. 180/8.1–8.6; 623/53–55; 901/1; 364/191; 446/276, 285; 305/2, 3

[56] References Cited

U.S. PATENT DOCUMENTS 758,317  4/1904  Jackson .

*Primary Examiner*—Robert J. Oberleitner
*Assistant Examiner*—C. T. Bartz
*Attorney, Agent, or Firm*—Richard L. Miller, P.E. Registered Patent Agent

[57] ABSTRACT

A robotic leg for traversing a path similar to that of a human leg during walking on a floor. The leg includes a housing, a wheel, a rail, a slide shaft, a follower, and a leg. The leg takes a step by rotating a shaft, causing the wheel to rotate, causing the slide shaft to pivotally move with the wheel, causing the slide shaft to slide down the follower, causing a plurality of outer roller bearings and an inner roller bearing to roll along a convex periphery of the rail, causing the follower to move along the convex periphery, causing a hip end of the leg to pivot forwardly about an inner roller pin, and causing an uppermost pair of flat rods of the leg to pivot forwardly about their midpoints. The leg rebounds from the step by continuing to rotate the shaft, causing the wheel to continue to rotate, causing the slide shaft to continue to pivotally move with the wheel, causing the slide shaft to slide up the follower, causing the plurality of outer roller bearings and the inner roller bearing to roll along a straight periphery of the rail, causing the follower to move along the straight periphery, causing the hip end to pivot rearwardly about the inner roller pin and causing the uppermost pair of flat rods to pivot rearwardly about their midpoints.

26 Claims, 10 Drawing Sheets

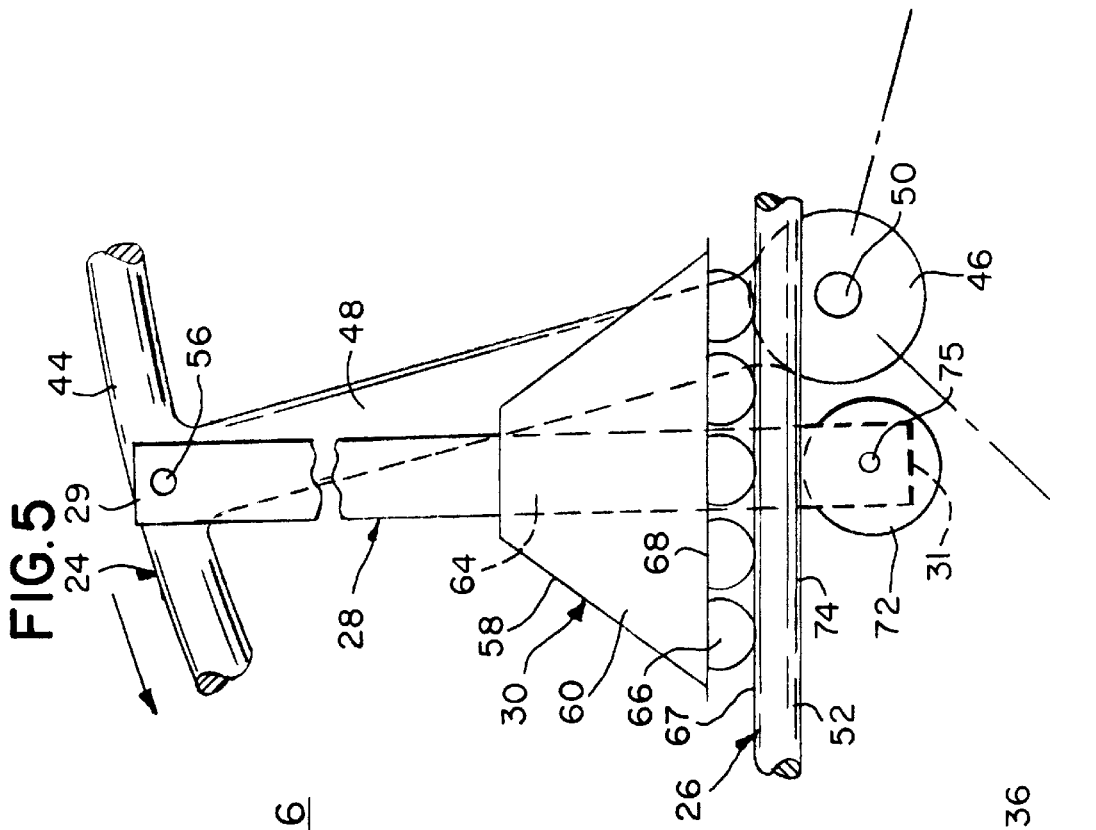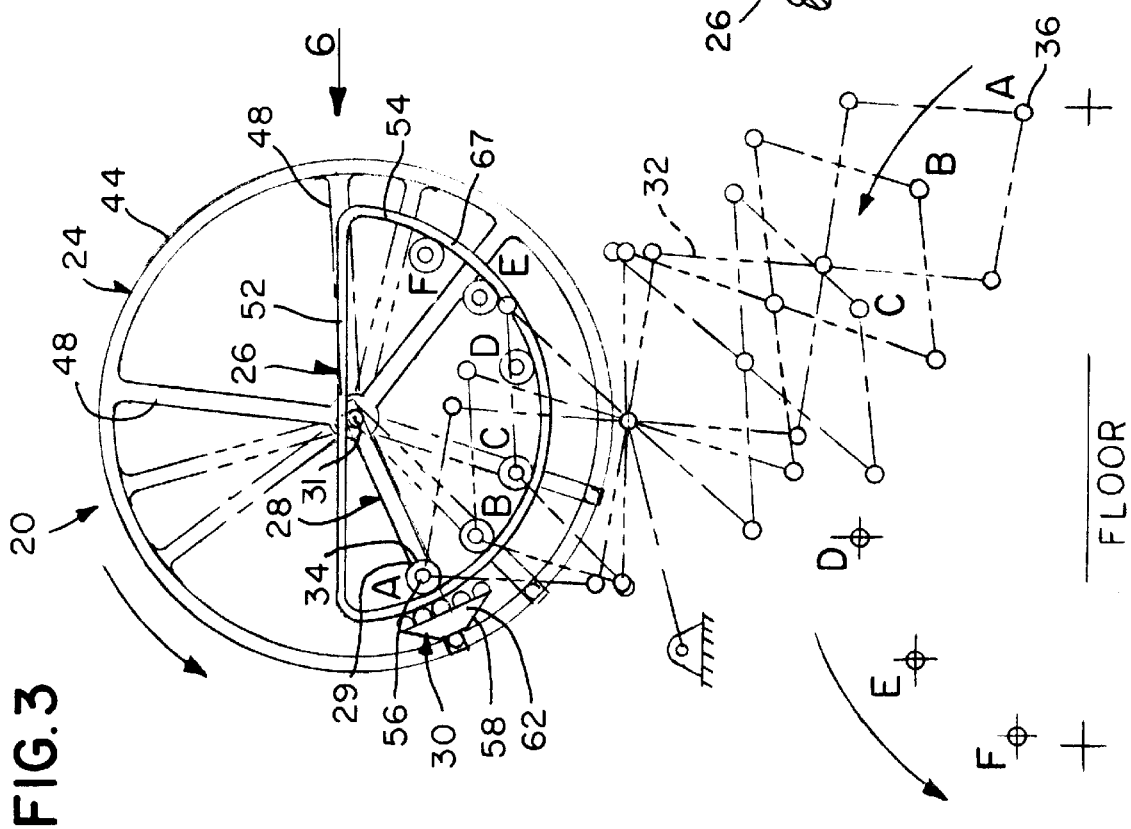

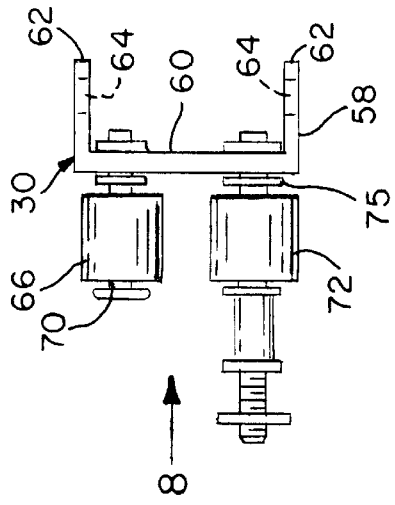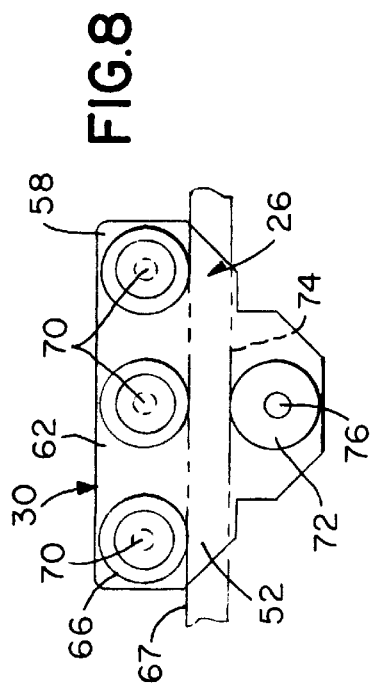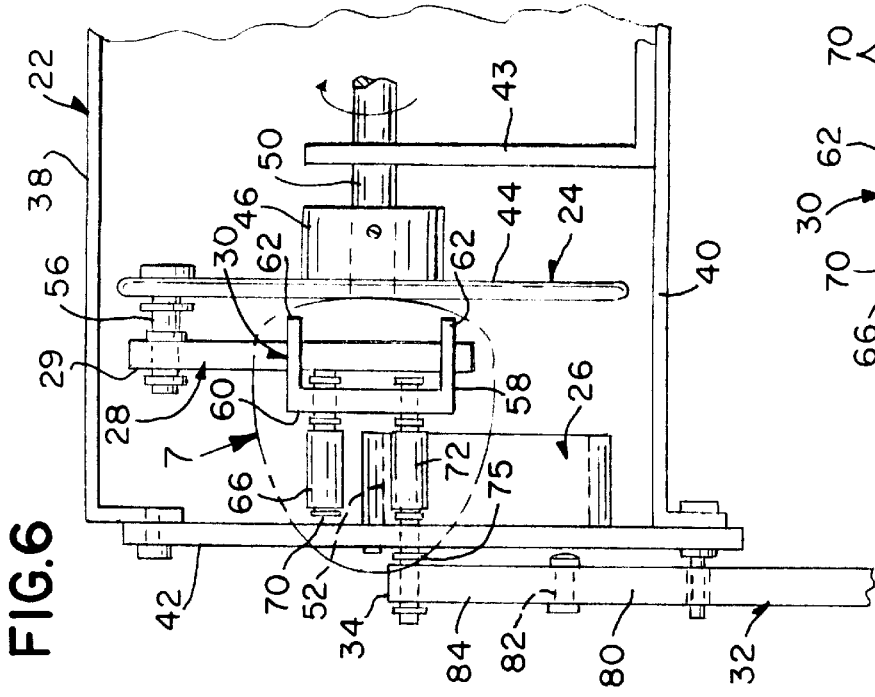

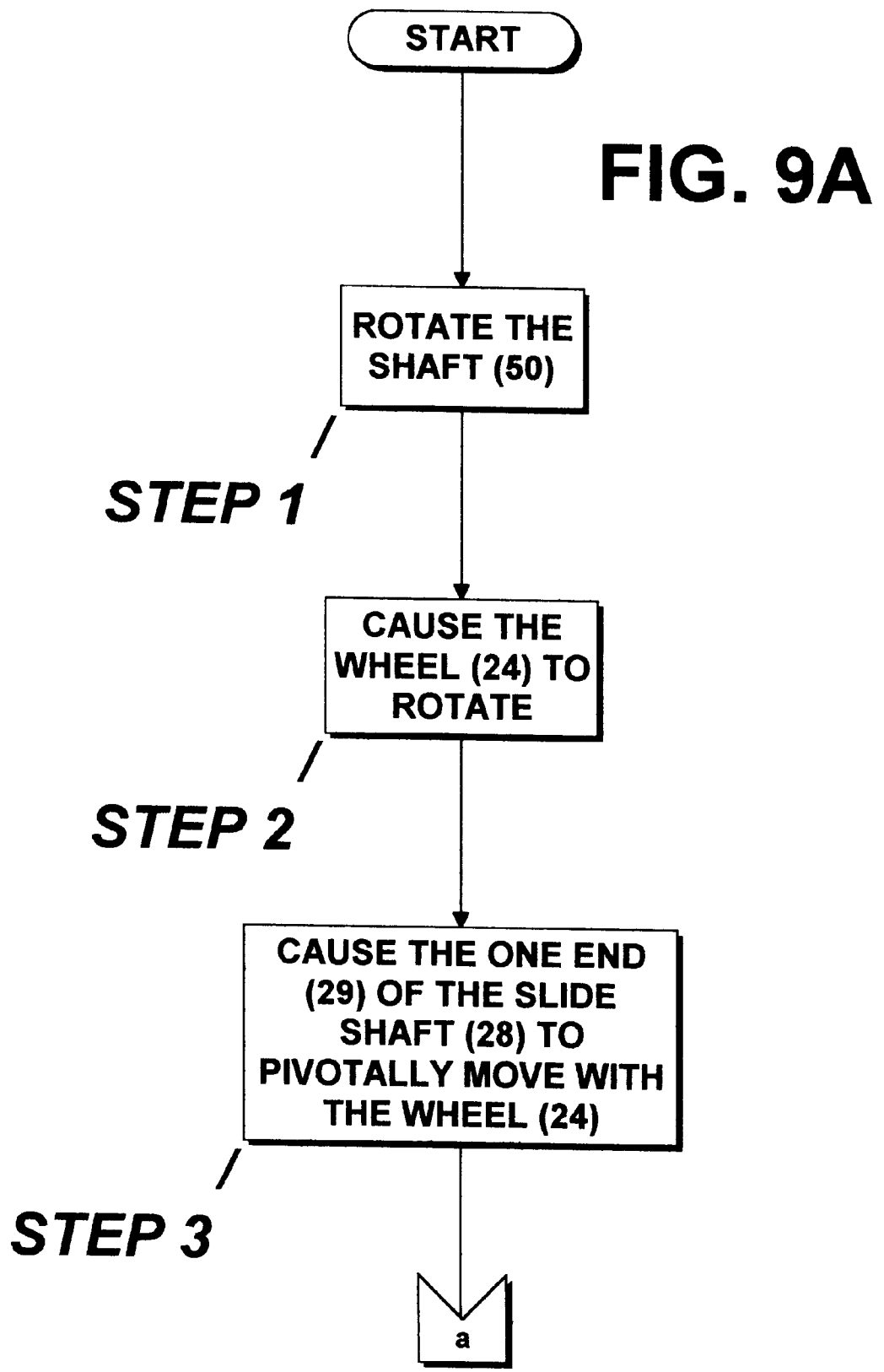

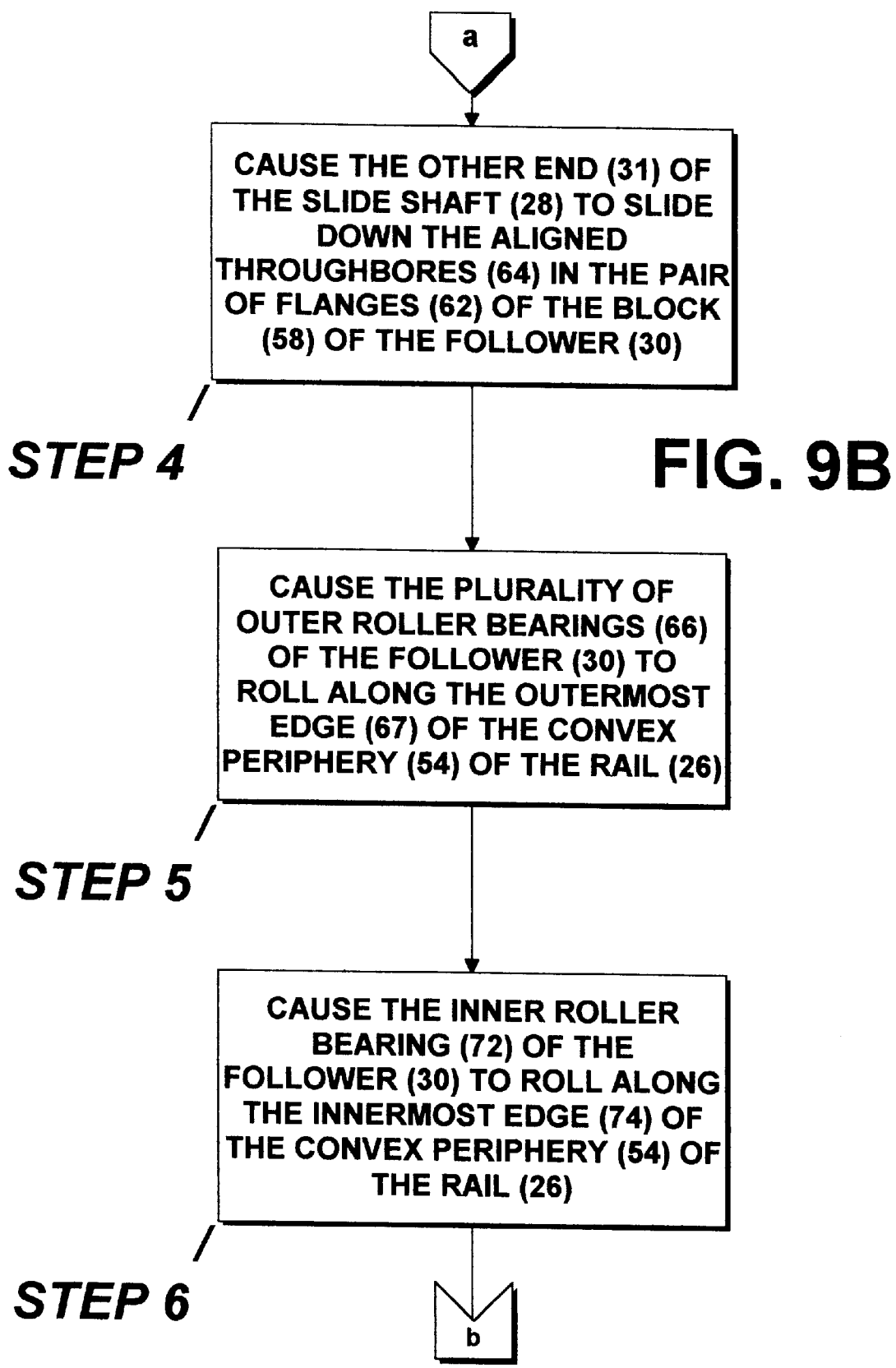

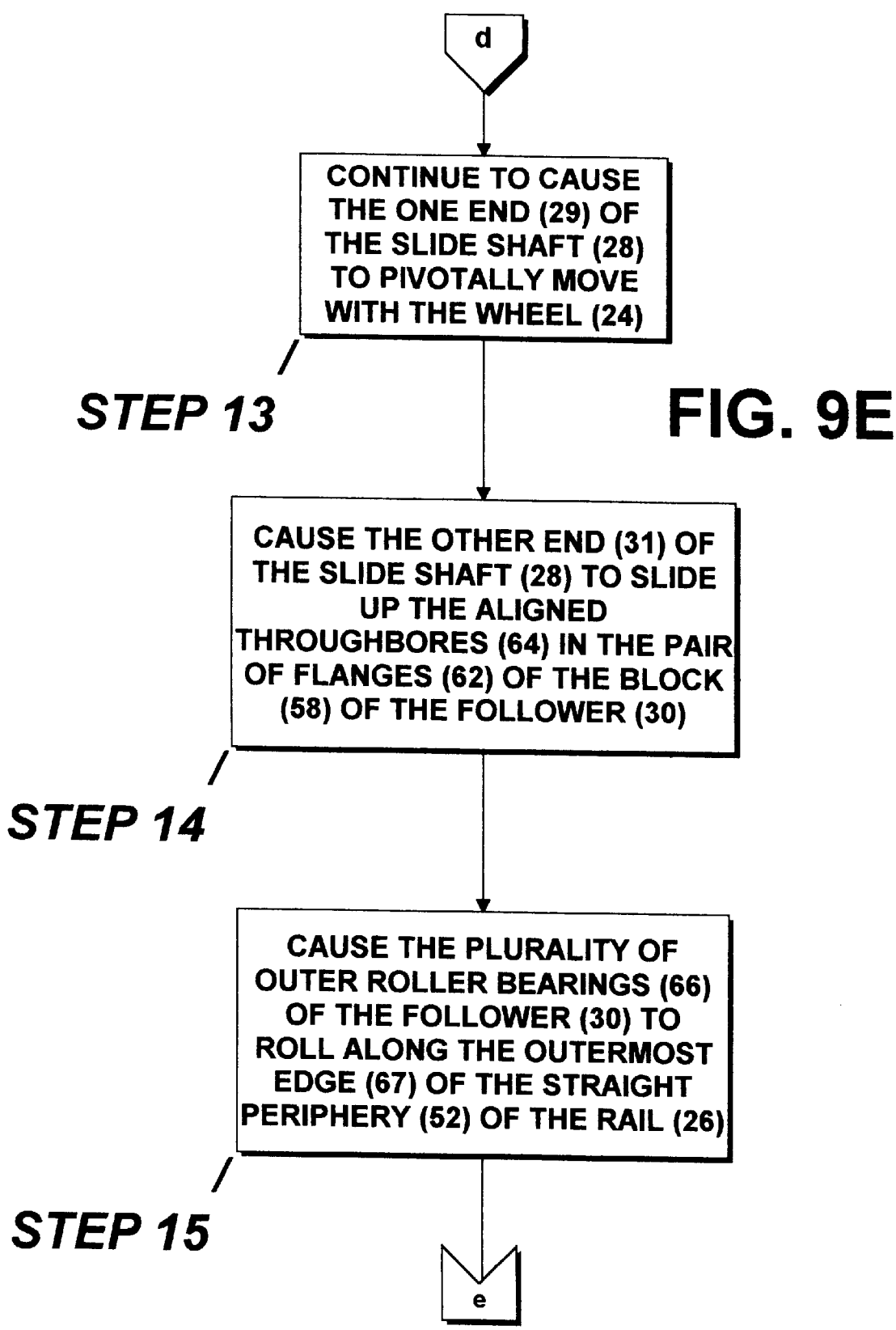

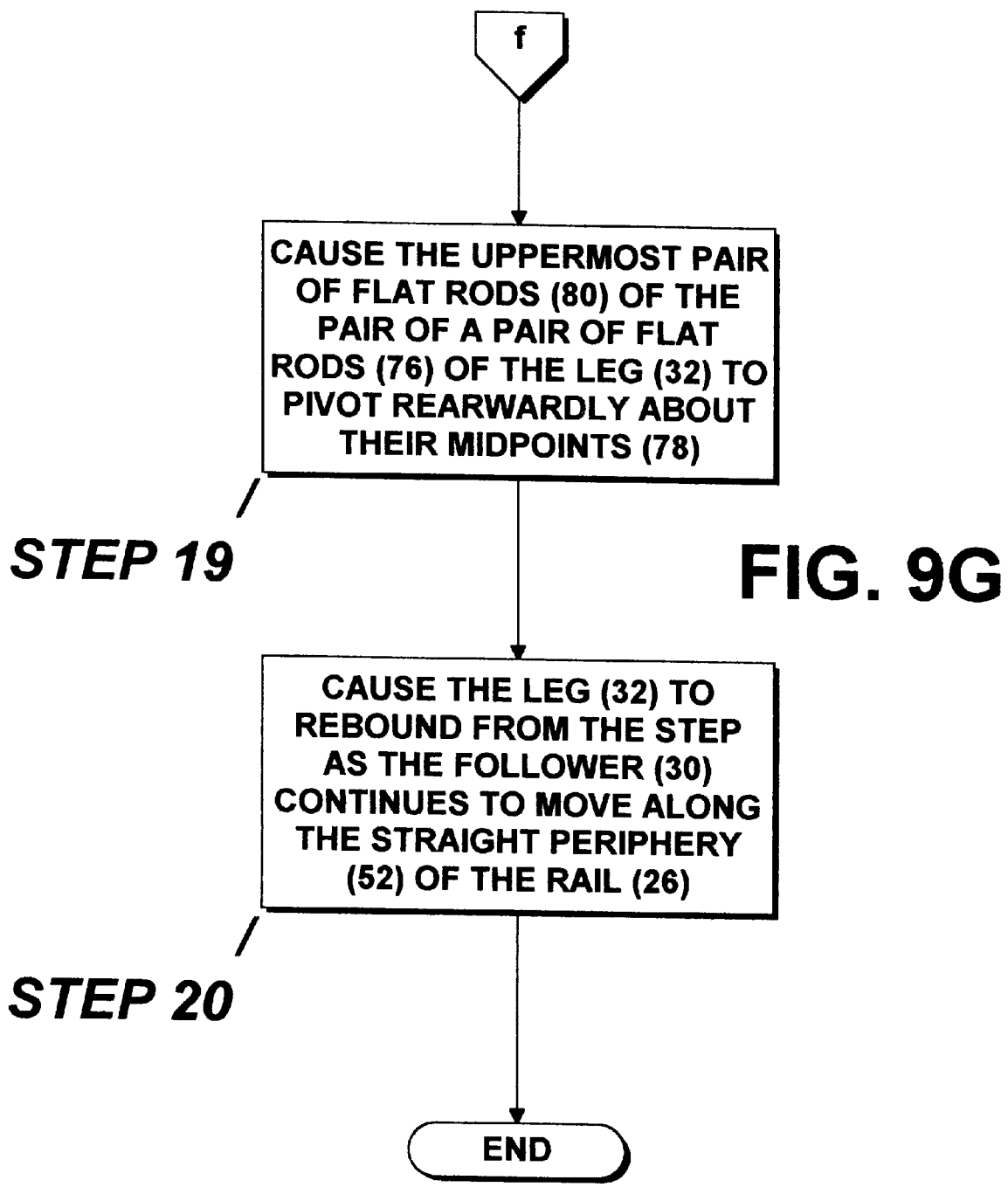

ically, the present invention relates to a robotic leg. More
ROBOTIC LEG FOR TRAVERSING A PATH SIMILAR TO THAT OF A HUMAN LEG DURING WALKING

CROSS REFERENCE TO RELATED APPLICATIONS

The instant application contains subject matter disclosed in applicant's Disclosure Document No. 424448, and as such, it is respectfully requested in a separate paper that this Disclosure Document be relied upon and remain a permanent part of the file history during the prosecution of the instant application and during any subsequent action thereof.

BACKGROUND OF THE INVENTION

1. Field of the Invention

The present invention relates to a robotic leg. More particularly, the present invention relates to a robotic leg for traversing a path similar to that of a human leg during walking.

2. Description of the Prior Art

Numerous innovations for robotics have been provided in the prior art. Even though these innovations may be suitable for the specific individual purposes to which they address, however, they differ from the present invention. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a robotic leg for traversing a path similar to that of a human leg during walking that avoids the disadvantages of the prior art.

ANOTHER OBJECT of the present invention is to provide a robotic leg for traversing a path similar to that of a human leg during walking that is simple and inexpensive to manufacture.

STILL ANOTHER OBJECT of the present invention is to provide a robotic leg for traversing a path similar to that of a human leg during walking that is simple to use.

BRIEFLY STATED, YET ANOTHER OBJECT of the present invention is to provide a robotic leg for traversing a path similar to that of a human leg during walking on a floor. The leg includes a housing for positioning at an elevation similar to that of a human pelvis, a wheel rotatably mounted in the housing, a rail fixedly mounted in the housing, a slide shaft pivotally mounted, at one end, to the wheel, and free at its other end, a follower rollably mounted to the rail and slidably receiving the slide shaft, and a leg pivotally mounted, at a hip end, to the follower, and depending therefrom, to a foot end for contacting the floor. The leg takes a step by rotating a shaft, which causes the wheel to rotate, which causes the one end of the slide shaft to pivotally move with the wheel, which causes the other end of the slide shaft to slide down the follower, which causes a plurality of outer roller bearings and an inner roller bearing roll along a convex periphery of the rail, which causes the follower to move along the convex periphery, which causes a hip end of the leg to pivot forwardly about an inner roller pin, which causes an uppermost pair of flat rods of the leg to pivot forwardly about their midpoints, and which causes the leg to take a step as the follower continues to move along the convex periphery. The leg rebounds from the step by continuing to rotate the shaft, which causes the wheel to continue to rotate, which causes the one end of the slide shaft to continue to pivotally move with the wheel, which causes the other end of the slide shaft to slide up the follower, which causes the plurality of outer roller bearings and the inner roller bearing to roll along a straight periphery of the rail, which causes the follower to move along the straight periphery, which causes the hip end to pivot rearwardly about the inner roller pin, which causes the uppermost pair of flat rods to pivot rearwardly about their midpoints, and which causes the leg to rebound from the step as the follower continues to move along the straight periphery.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

Figure 4:
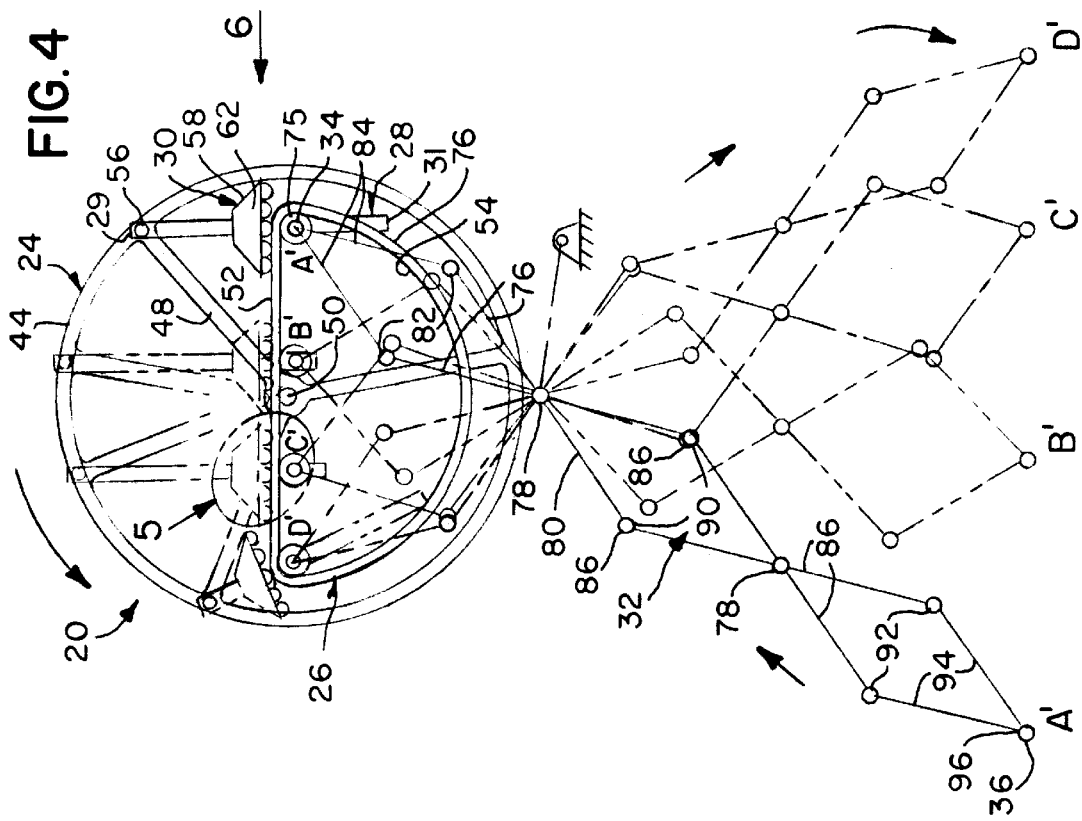
Figure 1:
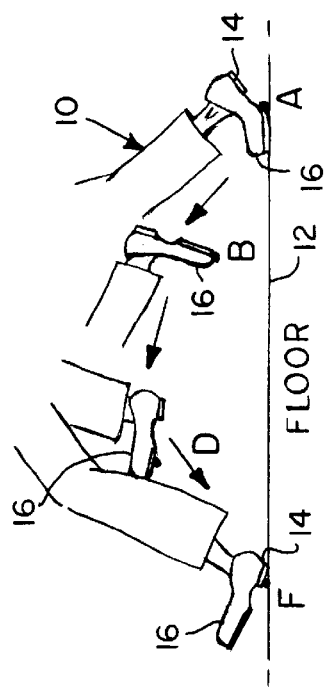
Figure 2:
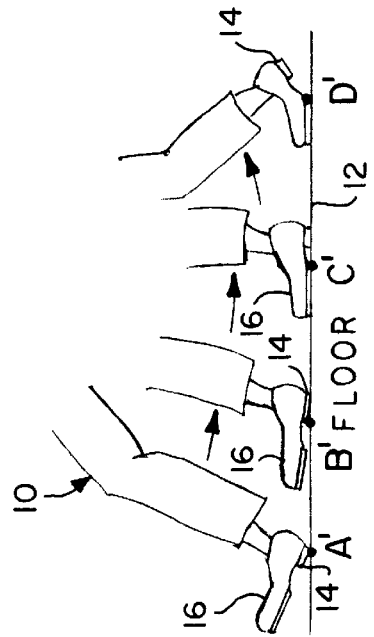
Figure 9C:
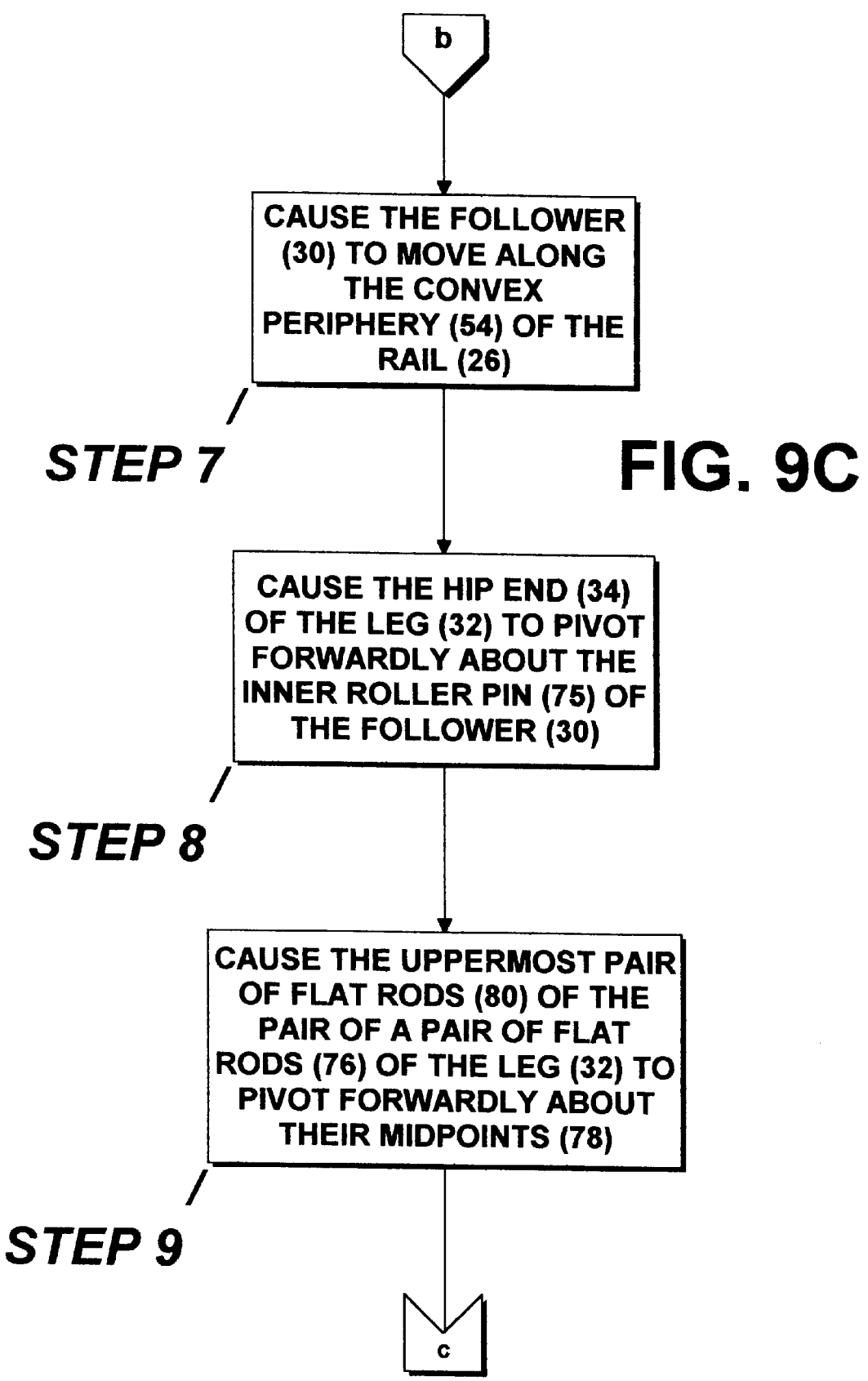
Figure 9D:
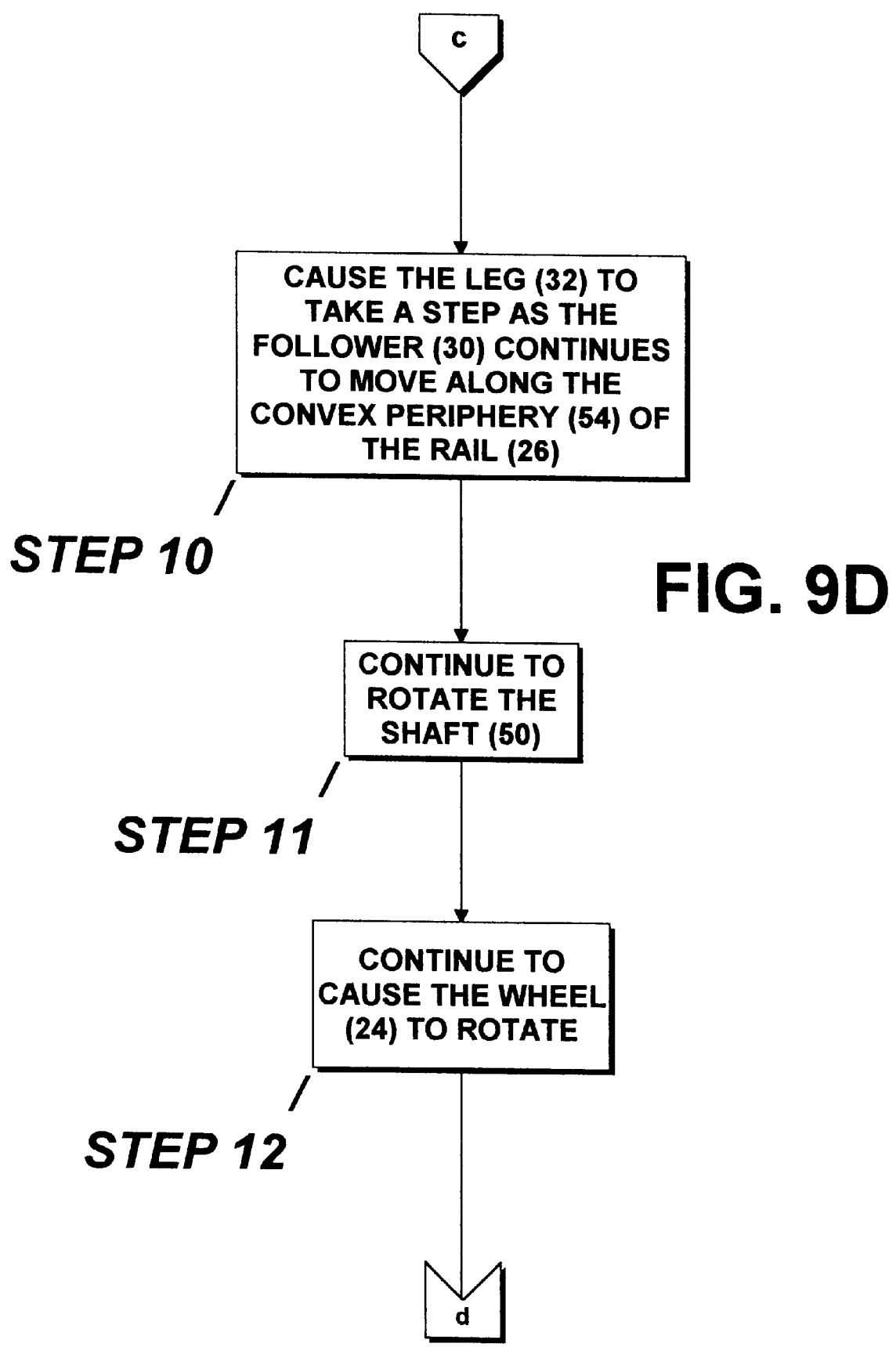
Figure 9F:
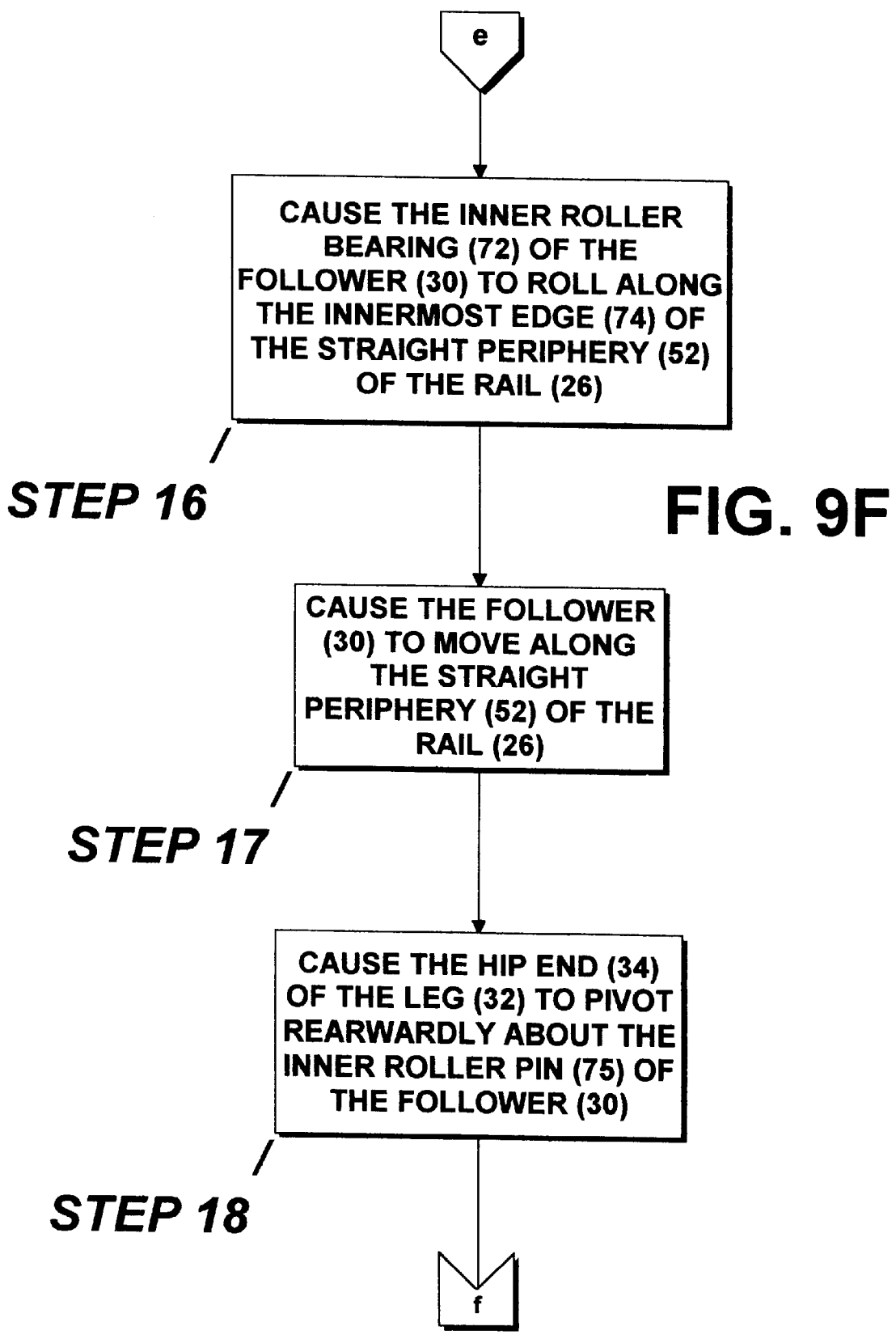

| | |
|---|---|
| FIG. 1 | is a diagrammatic side elevational view of the path taken when a human leg advances into a step; |
| FIG. 2 | is a diagrammatic side elevational view of the path taken when a human leg rebounds from the step; |
| FIG. 3 | is a diagrammatic side elevational view of the present invention traversing a path similar to the path traversed by the human leg shown in FIG. 1; |
| FIG. 4 | is a diagrammatic side elevational view of the present invention traversing a path similar to the path traversed by the human leg shown in FIG. 2; |
| FIG. 5 | is an enlarged diagrammatic side elevational view of the area generally enclosed in the dotted circle identified by arrow 5 in FIG. 4; |
| FIG. 6 | is an enlarged fragmented front elevational view taken generally in the direction of arrow 6 in FIGS. 3 and 4; |
| FIG. 7 | is an enlarged top plan view of the area generally enclosed by the dotted ellipse identified by arrow 7 in FIG. 6; |
| FIG. 8 | is a diagrammatic side elevational view taken generally in the direction of arrow 8 in FIG. 7; and |
| FIGS. 9A–9G | are a process flow chart of the operation of the present invention. |

LIST OF REFERENCE NUMERALS UTILIZED IN THE DRAWING

| | |
|---|---|
| A | point where heel 14 first leaves floor 12, with toes 16 still contacting the floor 12, as human leg 10 takes step on floor 12 |
| B | point where toes 16 leave floor 12 and face substantially downwardly, as human leg 10 takes step on floor 12 |
| D | point where toes 16 point substantially forwardly, as human leg 10 takes step on floor 12 |
| F | point where heel 14 contacts floor 12, with toes 16 being off floor 12, as human leg 10 takes step on floor 12 |
| A' | point where toes 16 first leave floor 12, with heel 14 still contacting floor 12, as human leg 10 rebounds from step on floor 12, |
| B' | point where toes 16 approach, but do not contact, floor 12, with heel 14 still contacting floor 12, as human leg 10 rebounds from step on floor 12 |
| C' | point where toes 16 contact floor 12, as human leg 10 rebounds from step on floor 12 |

-continued

LIST OF REFERENCE NUMERALS UTILIZED IN THE DRAWING

| | |
|---|---|
| D' | point where heel 14 leaves floor 12, as human leg 10 rebounds from step on floor 12 |
| 10 | human leg |
| 12 | floor |
| 14 | heel |
| 16 | toes |
| 20 | robotic leg for traversing a path similar to that of a human leg during walking of the present invention |
| 22 | housing for positioning at elevation similar to that of human pelvis |
| 24 | wheel rotatably mounted in housing 22 |
| 26 | rail fixedly mounted in housing 22 |
| 28 | slide shaft pivotally mounted, at one end 29, to wheel 24, and free at other end 31 |
| 29 | one end of slide shaft 28 |
| 30 | follower rollably mounted to rail 26 and slidably receiving slide shaft 28 |
| 31 | other end of slide shaft 28 |
| 32 | leg pivotally mounted, at hip end 34, to follower 30, and depending therefrom, to foot end 36 for contacting floor 12 |
| 34 | hip end of leg 32 |
| 36 | foot end of leg 32 |
| 38 | upper plate of housing 22 |
| 40 | lower plate of housing 22 disposed below, and parallel to, upper plate 38 of housing 22 |
| 42 | side plate of housing 22 for positioning at position similar to that of human hip, and replaceably mounted to upper plate 38 of housing 22 and lower plate 40 of housing 22 |
| 43 | L-bracket of housing 22 affixed perpendicularly to lower plate 40 of, and extending into, housing 22 |
| 44 | rim of wheel 24 |
| 46 | central hub of wheel 24 |
| 48 | plurality of spokes of wheel 24 connecting central hub 46 of wheel 24 to rim 44 of wheel 24 |
| 50 | shaft replaceably mounted through central hub 46 of wheel 24 for rotation therewith and rotatably mounted through L-bracket 43 of housing 22 for rotation relative thereto |
| 52 | straight periphery of rail 26 extending across horizontal diameter of wheel 22, equidistantly from central hub 46 of wheel 24, to just short of rim 44 of wheel 24 |
| 54 | convex periphery of rail 26 depending from straight periphery 52 of rail 26 to concentric with, and just short of, rim 44 of wheel 24 |
| 56 | pivot pin pivotally mounting one end 29 of slide shaft 28 to rim 44 of wheel 24 |
| 58 | block of follower 30 |
| 60 | web of block 58 of follower 30 |
| 62 | pair of flanges of block 58 of follower 30 |
| 64 | aligned throughbores extending laterally through pair of flanges of block 58 of follower 30 and slidably receiving other end 31 of slide shaft 28 |
| 66 | plurality of outer roller bearings 66 of follower 30 engaging, and rolling along, rail 26, at outermost edge 67 |
| 67 | outermost edge of rail 26 |
| 68 | longer parallel side of web 60 of block 58 of follower 30 |
| 70 | plurality of outer roller pins rotatably mounting plurality of outer roller bearings 66 of follower 30 along web 60 of block 58 of follower 30, at its longer parallel side 68, by extending freely through plurality of roller bearings 66 of follower 30 and fixedly through web 60 of block 58 of follower 30 |
| 72 | inner roller bearing of follower 30 engaging, and rolling along, rail 26, at innermost edge 74 |
| 74 | innermost edge of rail 26 |
| 75 | inner roller pin 75 rotatably mounting inner roller bearing 72 of follower 30 along web 60 of block 58 of follower 30, below longer parallel side 68, by extending fixedly outwardly through web 60 of block 58 of follower 30, freely through inner roller bearing 72 of follower 30, and freely through, and past, side plate 42 of housing 22 |
| 76 | pair of a pair of flat rods of leg 32 |
| 78 | midpoints pivotally mounting each pair of flat rods of pair of a pair of flat rods 76 of leg 32 to each other |
| 80 | uppermost pair of flat rods of pair of a pair of flat rods 76 of leg 32 |
| 82 | uppermost ends of uppermost pair of flat rods 80 of pair of a pair of flat rods 76 of leg 32 |

-continued

LIST OF REFERENCE NUMERALS UTILIZED IN THE DRAWING

| | |
|---|---|
| 84 | pair of upper flat rods pivotally mounted to uppermost ends 82 of uppermost pair of flat rods 80 of pair of a pair of flat rods 76 of leg 32 |
| 86 | lowermost ends of uppermost pair of flat rods 80 of pair of a pair of flat rods 76 of leg 32 |
| 88 | lowermost pair of flat rods of pair of a pair of flat rods 76 of leg 32 |
| 90 | uppermost ends of lowermost pair of flat rods 88 of pair of a pair of flat rods 76 of leg 32 pivotally mounted to lowermost ends 86 of uppermost pair of flat rods 80 of pair of a pair of flat rods 76 of leg 32 |
| 92 | lowermost ends of lowermost pair of flat rods 88 of pair of a pair of flat rods 76 of leg 32 |
| 94 | pair of lower flat rods pivotally mounted to lowermost ends 92 of lowermost pair of flat rods 88 of pair of a pair of flat rods 76 of leg 32 |

DETAILED DESCRIPTION OF THE PREFERRED EMBODIMENT

In describing the present invention, it is important to first discuss the path traversed by a human leg as it takes a step and rebounds from the step. This can best be seen in FIGS. 1 and 2, and as such, will be discussed with reference thereto.

As shown in FIG. 1, as a human leg 10 takes a step on a floor 12, the heel 14 first leaves the floor 12, with the toes 16 still contacting the floor 12 at point A. Subsequently thereto, the toes 16 leave the floor 12 and face substantially downwardly at point B. Subsequently thereto, the toes 16 point substantially forwardly at point D. Subsequently thereto, finally, the heel 14 contacts the floor 12 at point F, with the toes 16 being off the floor 12.

As shown in FIG. 2, as the human leg 10 rebounds from the step on the floor 12, the toes 16 first leave the floor 12, with the heel 14 still contacting the floor 12 at point A'. Subsequently thereto, the toes 16 approach, but do not contact, the floor 12, with the heel 14 still contacting the floor 12 at point B'. Subsequently thereto, the toes 16 contact the floor 12 at point C'. Finally, subsequently thereto, the heel 14 leaves floor 12 at point D'.

Referring now to the figures, in which like numerals indicate like part, and particularly to FIGS. 3–8, the robotic leg for traversing a path similar to that of a human leg during walking of the present invention is shown generally at 20.

The robotic leg for traversing a path similar to that of a human leg during walking 20 comprises a housing 22 for positioning at an elevation similar to that of a human pelvis, a wheel 24 rotatably mounted in the housing 22, a rail 26 fixedly mounted in the housing 22, a slide shaft 28 pivotally mounted, at one end 29, to the wheel 24, and free at its other end 31, a follower 30 rollably mounted to the rail 26 and slidably receiving the slide shaft 28, and a leg 32 pivotally mounted, at a hip end 34, to the follower 30, and depending therefrom, to a foot end 36 for contacting the floor 12.

The housing 22 comprises an upper plate 38, a lower plate 40 disposed below, and parallel to, the upper plate 38 of the housing 22, a side plate 42 for positioning at a position similar to that of a human hip, and is replaceably mounted to the upper plate 38 of the housing 22 and the lower plate 40 of the housing 22, and an L-bracket 43 affixed perpendicularly to the lower plate 40 of, and extends into, the housing 22.

The wheel 24 has a horizontal diameter and comprises a rim 44, a central hub 46, and a plurality of spokes 48 that connect the central hub 46 of the wheel 24 to the rim 44 of the wheel 24.

The wheel 24 is rotatably mounted in the housing 22 and parallelaly spaced inward from the side plate 42 of the housing 22, by a shaft 50.

The shaft 50 is replaceably mounted through the central hub 46 of the wheel 24 for rotation therewith and rotatably mounted through the L-bracket 43 of the housing 22 for rotation relative thereto.

The rail 26 is open and D-shaped.

The rail is positioned fixedly against the side plate 42 of the housing 22, spaced outward from, and parallel to, the wheel 24, and has a straight periphery 52 and a convex periphery 54.

The straight periphery 52 of the rail 26 extends across the horizontal diameter of the wheel 22, equidistantly from the central hub 46 of the wheel 24, to just short of the rim 44 of the wheel 24.

The convex periphery 54 of the rail 26 depends from the straight periphery 52 of the rail 26 to concentric with, and just short of, the rim 44 of the wheel 24.

The slide shaft 28 is slender and elongated.

The slide shaft 28 is disposed between, and parallelaly spaced from, the wheel 24 and the rail 26, and is pivotally mounted, at its one end 29, to the rim 44 of the wheel 24, by a pivot pin 56, with its other end 31 extending inwardly therefrom.

The follower 30 comprises a block 58 that is substantially channel-shaped in plan with a web 60 that is frustum-shaped in elevation, and a pair of flanges 62.

The web 60 of the block 58 of the follower 30 is parallelaly spaced between the wheel 24 and the rail 26.

The pair of flanges of the block 58 of the follower 30 are parallel and extend perpendicularly from the web 60 of the block 58 of the follower 30, in a direction away from the rail 26, and extend between the upper plate 38 of the housing 22 and the lower plate 40 of the housing 22.

The pair of flanges of the block 58 of the follower 30 have aligned throughbores 64 that extend laterally therethrough, and which slidably receive the other end 31 of the slide shaft 28.

The follower 30 further comprises a plurality of outer roller bearings 66 that engage, and roll along, the rail 26, at its outermost edge 67.

The plurality of outer roller bearings 66 of the follower 30 are rotatably mounted along the web 60 of the block 58 of the follower 30, at its longer parallel side 68, by a plurality of outer roller pins 70, that extend freely through the plurality of roller bearings 66 of the follower 30 and fixedly through the web 60 of the block 58 of the follower 30.

The follower 30 further comprises an inner roller bearing 72 that engages, and rolls along, the rail 26, at its innermost edge 74.

The inner roller bearing 72 of the follower 30 is rotatably mounted along the web 60 of the block 58 of the follower 30, below its longer parallel side 68, by an inner roller pin 75 that extends fixedly outwardly through the web 60 of the block 58 of the follower 30, freely through the inner roller bearing 72 of the follower 30, and freely through, and past, the side plate 42 of the housing 22.

The leg 32 comprises a pair of a pair of flat rods 76. Each pair of flat rods of the pair of a pair of flat rods 76 of the leg 32 are pivotally mounted to each other, at their midpoints 78.

The pair of a pair of flat rods 76 of the leg 32 have an uppermost pair of flat rods 80, whose midpoints 78 are pivotally mounted to the housing 22.

The uppermost pair of flat rods 80 of the pair of a pair of flat rods 76 of the leg 32 have uppermost ends 82 that have a pair of upper flat rods 84 pivotally mounted thereto that converge therefrom together at the hip end 34 of the leg 32 where they are pivotally mounted on the inner roller pin 75, external to the housing 22, and lowermost ends 86.

The pair of a pair of flat rods 76 of the leg 32 further have a lowermost pair of flat rods 88, whose midpoints 78 are pivotally mounted to each other.

The lowermost pair of flat rods 88 of the pair of a pair of flat rods 76 of the leg 32 have uppermost ends 90 that are pivotally mounted to the lowermost ends 86 of the uppermost pair of flat rods 80 of the pair of a pair of flat rods 76 of the leg 32.

The lowermost pair of flat rods 88 of the pair of a pair of flat rods 76 of the leg 32 further have lowermost ends 92 that have a pair of lower flat rods 94 pivotally mounted thereto that converge depending therefrom together where they are pivotally mounted to each other at the foot end 36.

The operation of the robotic leg for traversing a path similar to that of a human leg during walking can best be seen in FIGS. 9A–9G, and as such, will be discussed with reference thereto.

| | |
|---|---|
| STEP 1: | Rotate the shaft 50. |
| STEP 2: | Cause the wheel 24 to rotate. |
| STEP 3: | Cause the one end 29 of the slide shaft 28 to pivotally move with the wheel 24. |
| STEP 4: | Cause the other end 31 of the slide shaft 28 to slide down the aligned throughbores 64 in the pair of flanges 62 of the block 58 of the follower 30. |
| STEP 5: | Cause the plurality of outer roller bearings 66 of the follower 30 to roll along the outermost edge 67 of the convex periphery 54 of the rail 26. |
| STEP 6: | Cause the inner roller bearing 72 of the follower 30 to roll along the innermost edge 74 of the convex periphery 54 of the rail 26. |
| STEP 7: | Cause the follower 30 to move along the convex periphery 54 of the rail 26. |
| STEP 8: | Cause the hip end 34 of the leg 32 to pivot forwardly about the inner roller pin 75 of the follower 30. |
| STEP 9: | Cause the uppermost pair of flat rods 80 of the pair of a pair of flat rods 76 of the leg 32 to pivot forwardly about their midpoints 78. |
| STEP 10: | Cause the leg 32 to take a step as the follower 30 continues to move along the convex periphery 54 of the rail 26. |
| STEP 11: | Continue to rotate the shaft 50. |
| STEP 12: | Continue to cause the wheel 24 to rotate. |
| STEP 13: | Continue to cause the one end 29 of the slide shaft 28 to pivotally move with the wheel 24. |
| STEP 14: | Cause the other end 31 of the slide shaft 28 to slide up the aligned throughbores 64 in the pair of flanges 62 of the block 58 of the follower 30. |
| STEP 15: | Cause the plurality of outer roller bearings 66 of the follower 30 to roll along the outermost edge 67 of the straight periphery 52 of the rail 26. |
| STEP 16: | Cause the inner roller bearing 72 of the follower 30 to roll along the innermost edge 74 of the straight periphery 52 of the rail 26. |
| STEP 17: | Cause the follower 30 to move along the straight periphery 52 of the rail 26. |
| STEP 18: | Cause the hip end 34 of the leg 32 to pivot rearwardly about the inner roller pin 75 of the follower 30. |
| STEP 19: | Cause the uppermost pair of flat rods 80 of the pair of a pair of flat rods 76 of the leg 32 to pivot rearwardly about their midpoints 78. |
| STEP 20: | Cause the leg 32 to rebound from the step as the follower 30 continues to move along the straight periphery 52 of the rail 26. |

It will be understood that each of the elements described above, or two or more together, may also find a useful application in other types of constructions differing from the types described above.

While the invention has been illustrated and described as embodied in a robotic leg for traversing a path similar to that of a human leg during walking, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A robotic leg for traversing a path similar to that of a human leg during walking on a floor, comprising:
    a) a housing for positioning at a first elevation above the floor;
    b) a wheel rotatably mounted in said housing;
    c) a rail fixedly mounted in said housing;
    d) a slide shaft pivotally mounted, at one end, to said wheel, and free at its other end;
    e) a follower rollably mounted to said rail and slidably receiving said slide shaft; and
    f) a leg pivotally mounted, at a one end, to said follower, and depending therefrom, to a second end for contacting the floor.

2. The robotic leg as defined in claim 1, wherein said housing comprises:
    a) an upper plate;
    b) a lower plate disposed below, and parallel to, said upper plate of said housing;
    c) a side plate for positioning at a elevation above the floor, and which is replaceably mounted to said upper plate of said housing and said lower plate of said housing; and
    d) an L-bracket affixed perpendicularly to said lower plate of, and extending into, said housing.

3. The robotic leg as defined in claim 2, wherein said wheel has a horizontal diameter and comprises:
    a) a rim;
    b) a central hub; and
    c) a plurality of spokes that connect said central hub of said wheel to said rim of said wheel.

4. The robotic leg as defined in claim 3, wherein said wheel is rotatably mounted in said housing and parallelaly spaced inward from said side plate of said housing, by a rotating shaft.

5. The robotic leg as defined in claim 4, wherein said rotating shaft is replaceably mounted through said central hub of said wheel for rotation therewith and rotatably mounted through said L-bracket of said housing for rotation relative thereto.

6. The robotic leg as defined in claim 3, wherein said rail is open and D-shaped.

7. The robotic leg as defined in claim 6, wherein said rail is positioned fixedly against said side plate of said housing, and spaced outward from, and parallel to, said wheel, and has a straight periphery and a convex periphery.

8. The robotic leg as defined in claim 7, wherein said straight periphery of said rail extends across said horizontal diameter of said wheel, equidistantly from said central hub of said wheel, to just short of said rim of said wheel.

9. The robotic leg as defined in claim 7, wherein said convex periphery of said rail depends from said straight periphery of said rail to concentric with, and just short of, said rim of said wheel.

10. The robotic leg as defined in claim 3, wherein said slide shaft is slender and elongated.

11. The robotic leg as defined in claim 3, wherein said slide shaft is disposed between, and parallelaly spaced from, said wheel and said rail, and is pivotally mounted, at its one end, to said rim of said wheel, by a pivot pin, with its other end extending inwardly therefrom.

12. The robotic leg as defined in claim 3, wherein said follower comprises a block that is substantially channel-shaped in plan, with a web that is frustum-shaped in elevation, and a pair of flanges.

13. The robotic leg as defined in claim 12, wherein said web of said block of said follower is parallelaly spaced between said wheel and said rail.

14. The robotic leg as defined in claim 12, wherein said pair of flanges of said block of said follower are parallel and extend perpendicularly from said web of said block of said follower, in a direction away from said rail, and extend between said upper plate of said housing and said lower plate of said housing.

15. The robotic leg as defined in claim 12, wherein said pair of flanges of said block of said follower have aligned throughbores that extend laterally therethrough, and which slidably receive said other end of said slide shaft.

16. The robotic leg as defined in claim 12, wherein said follower further comprises a plurality of outer roller bearings that engage, and roll along, said rail, at its outermost edge.

17. The robotic leg as defined in claim 16, wherein said plurality of outer roller bearings of said follower are rotatably mounted along said web of said block of said follower, at its longer parallel side, by a plurality of outer roller pins that extend freely through said plurality of roller bearings of said follower and fixedly through said web of said block of said follower.

18. The robotic leg as defined in claim 12, wherein said follower further comprises an inner roller bearing that engages, and rolls along, said rail, at its innermost edge.

19. The robotic leg as defined in claim 18, wherein said inner roller bearing of said follower is rotatably mounted along said web of said block of said follower, below its longer parallel side, by an inner roller pin that extends fixedly outwardly through said web of said block of said follower, freely through said inner roller bearing of said follower, and freely through, and past, said side plate of said housing.

20. The robotic leg as defined in claim 18, wherein said leg comprises a pair of a pair of flat rods.

21. The robotic leg as defined in claim 20, wherein each pair of flat rods of said pair of a pair of flat rods of said leg are pivotally mounted to each other, at their midpoints.

22. The robotic leg as defined in claim 20, wherein said pair of a pair of flat rods of said leg have an uppermost pair of flat rods, whose midpoints are pivotally mounted to said housing.

23. The robotic leg as defined in claim 20, wherein said uppermost pair of flat rods of said pair of a pair of flat rods of said leg have:
    a) uppermost ends that have a pair of upper flat rods pivotally mounted thereto that converge therefrom together at said one end of said leg where they are pivotally mounted on said inner roller pin, external to said housing; and b) lowermost ends.

24. The robotic leg as defined in claim 23, wherein said pair of a pair of flat rods of said leg further have a lowermost pair of flat rods, whose midpoints are pivotally mounted to each other.

25. The robotic leg as defined in claim 24, wherein said lowermost pair of flat rods of said pair of a pair of flat rods of said leg have uppermost ends that are pivotally mounted to said lowermost ends of said uppermost pair of flat rods of said pair of a pair of flat rods of said leg.

26. The robotic leg as defined in claim 24, wherein said lowermost pair of flat rods of said pair of a pair of flat of said leg further have lowermost ends that have a pair of lower flat rods pivotally mounted thereto that converge depending therefrom together where they are pivotally mounted to each other at said second end of said leg.

* * * * *